July 3, 1934.     B. DE MATTIA     1,964,844
TIRE SHAPING AND AIR BAG INSERTING MACHINE AND METHOD
Filed Aug. 29, 1929     7 Sheets-Sheet 5

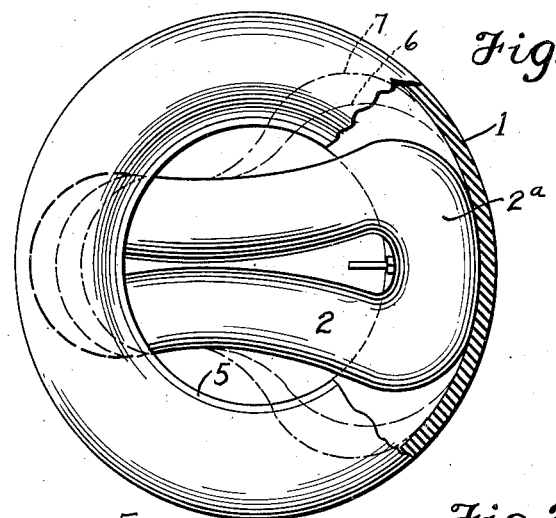
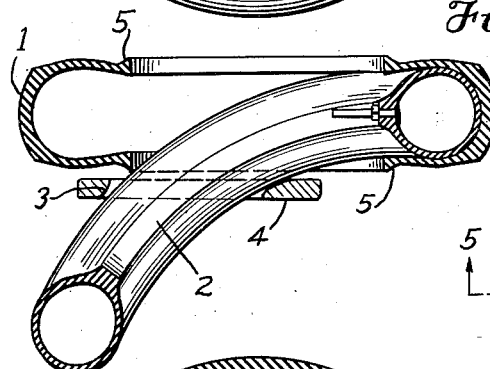
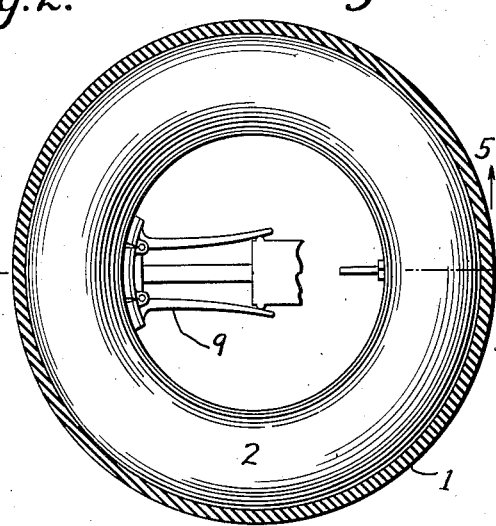
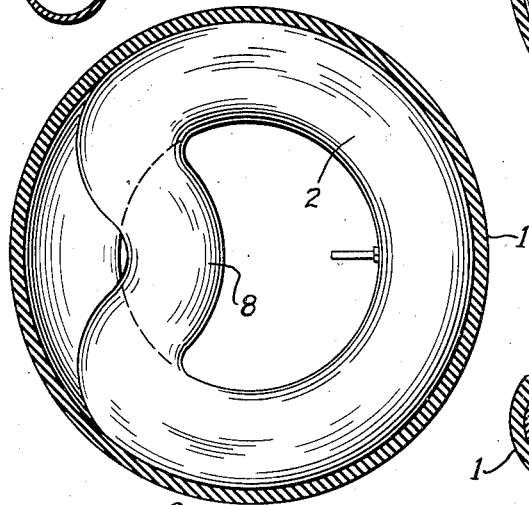

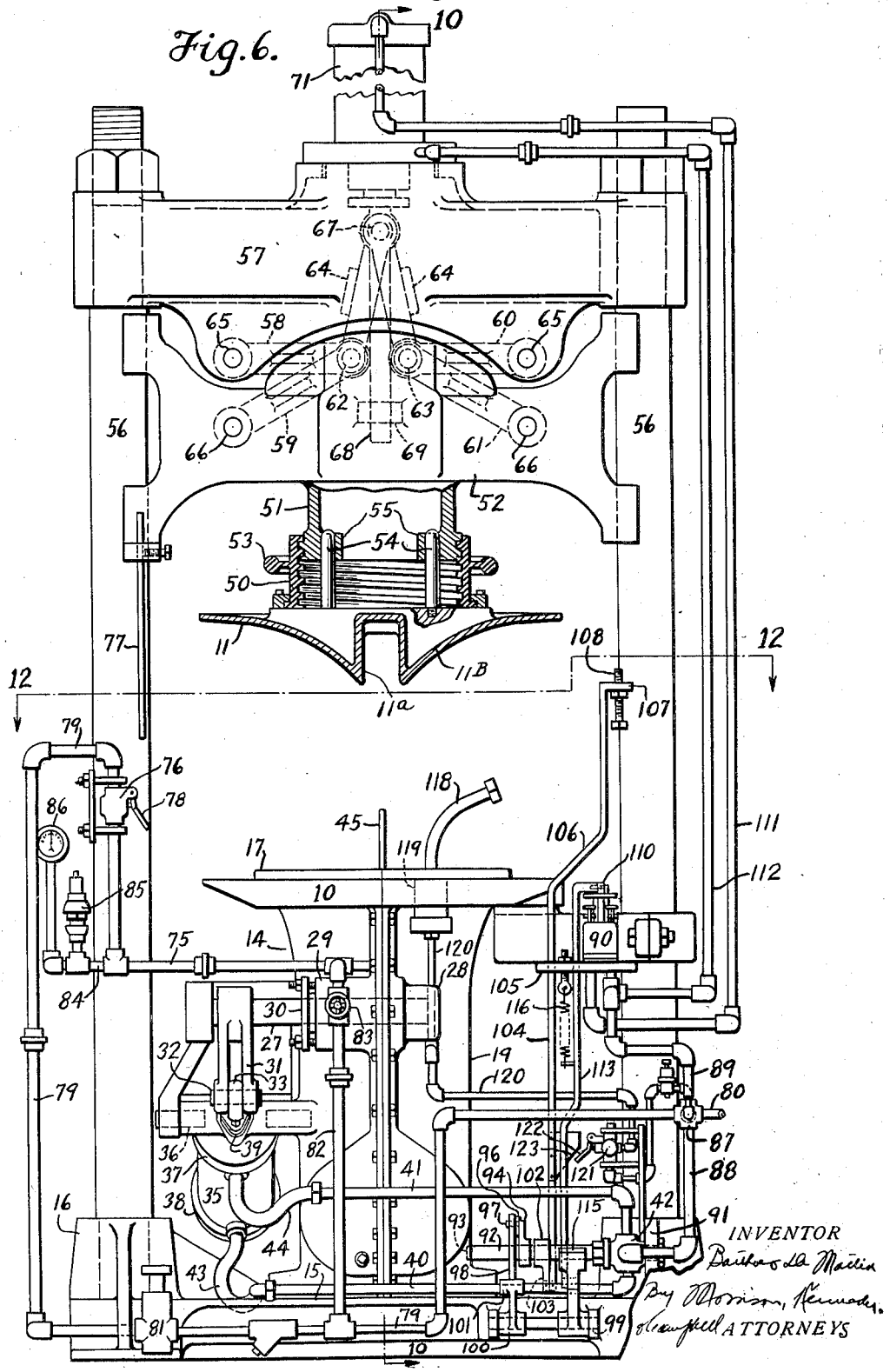

INVENTOR
Bartho[e]d De Mattia
BY Morrison Kennedy & Campbell
ATTORNEYS

July 3, 1934. B. DE MATTIA 1,964,844
TIRE SHAPING AND AIR BAG INSERTING MACHINE AND METHOD
Filed Aug. 29, 1929   7 Sheets-Sheet 6

INVENTOR
Bartold De Mattia
By Robinson Kennedy & Campbell
ATTORNEYS

July 3, 1934.  B. DE MATTIA  1,964,844
TIRE SHAPING AND AIR BAG INSERTING MACHINE AND METHOD
Filed Aug. 29, 1929  7 Sheets-Sheet 7

INVENTOR
Barthold De Mattia
BY Morrison Kennedy Campbell
ATTORNEYS

Patented July 3, 1934

1,964,844

UNITED STATES PATENT OFFICE 1,964,844

TIRE SHAPING AND AIR BAG INSERTING MACHINE AND METHOD

Barthold De Mattia, Passaic, N. J., assignor to The Goodyear Tire & Rubber Company, a corporation of Ohio Application August 29, 1929, Serial No. 389,121

21 Claims. (Cl. 18—2)

In the manufacture of pneumatic tires, it is customary to insert air bags or water bags within the tires prior to placing them in the vulcanizing molds, and this operation as now practiced is quite laborious and costly. In many establishments, hand labor is almost entirely relied upon, and while different machines have been proposed for reducing such hand labor, they have not proved to be entirely satisfactory. One of the principal difficulties arises from the fact that the bags must be contracted to within the compass of the bead diameters of the tires, and this cannot easily be done because of the thick heavy walls of the bags, which render them very stiff and unwieldy. The prior machines proposed for this purpose have for the most part operated on the same principle, namely of drawing portions of the bag radially inward in the normal plane of the bag and positioning it within the tire plane, and subsequently releasing the drawn-in portions of the bag simultaneously so as to allow the bag to reassume within the tire its original circular shape. Besides imposing severe bending stresses on the rubber walls which tend to shorten the life of the bags, this method of contraction is not at all suitable for tires of the small bead diameters, because in many sizes of tires the outside diameter of the contracted bag would be considerably greater than the bead diameter of the tire.

The present invention overcomes these and other difficulties, and provides a novel method and apparatus for inserting the bags in tires more expeditiously than has heretofore been possible and without regard to bead diameters, which may be as small as present day practice demands. More specifically, the invention contemplates the elongation of the bag sufficiently to give it a width slightly less (or not substantially greater) than the bead diameter of the tire. One end of the elongated bag is then placed in the tire at some point in its periphery, after which the bag is moved gradually (although rapidly) into the tire in an endwise direction, that portion of the bag which enters the tire being allowed (as it enters) progressively to resume its circular shape therein, while the trailing or uninserted portion of the bag is maintained in elongated condition, so as to be kept within the compass of the bead diameter, until it finally enters the tire, and is then allowed to return to circular shape within it. If desired, the bag may be elongated in its own plane and then inserted into the tire along a straight path disposed at an inclination to the tire plane, or otherwise, but it is preferred to give the bag a curved elongate shape and then to insert it within the tire by an endwise motion in an arcuate path conforming to the curvature of the elongated bag, this latter method being found in actual practice to be extremely efficient and satisfactory in all respects.

While the invention may be practiced with tires of the core-built type, it is shown herein in connection with drum-built tires, the bags being placed automatically within the tires after they have been given tire shape from their initial pulley band form. In the present instance, the invention is disclosed as applied to or embodied in an improved tire shaping press, which employs internal air pressure to aid in shaping the tire pulley bands as their beads are moved toward each other, while in another embodiment, presented in a separate application, the invention is used with what is known in the art as a vacuum box for shaping the tires.

The foregoing and other objects, features, and advantages of the invention will be readily appreciated from the following description in connection with the accompanying drawings, wherein the invention has been shown by way of illustration and wherein, Fig. 1 is a diagrammatic plan view, partly in section, showing how an air bag or water bag is presented to a tire in accordance with the novel method;

Fig. 2 is a transverse sectional view taken through the same;

Fig. 3 is a view similar to Fig. 1, but showing the bag entirely in the plane of the tire;

Fig. 4 is a similar view showing the bag entirely expanded within the tire;

Fig. 5 is a transverse sectional view taken on the line 5—5 of Fig. 4;

Fig. 6 is a front elevation, partly in section, of a tire shaping press embodying the invention, and showing the parts in position of rest;

Figure 7:
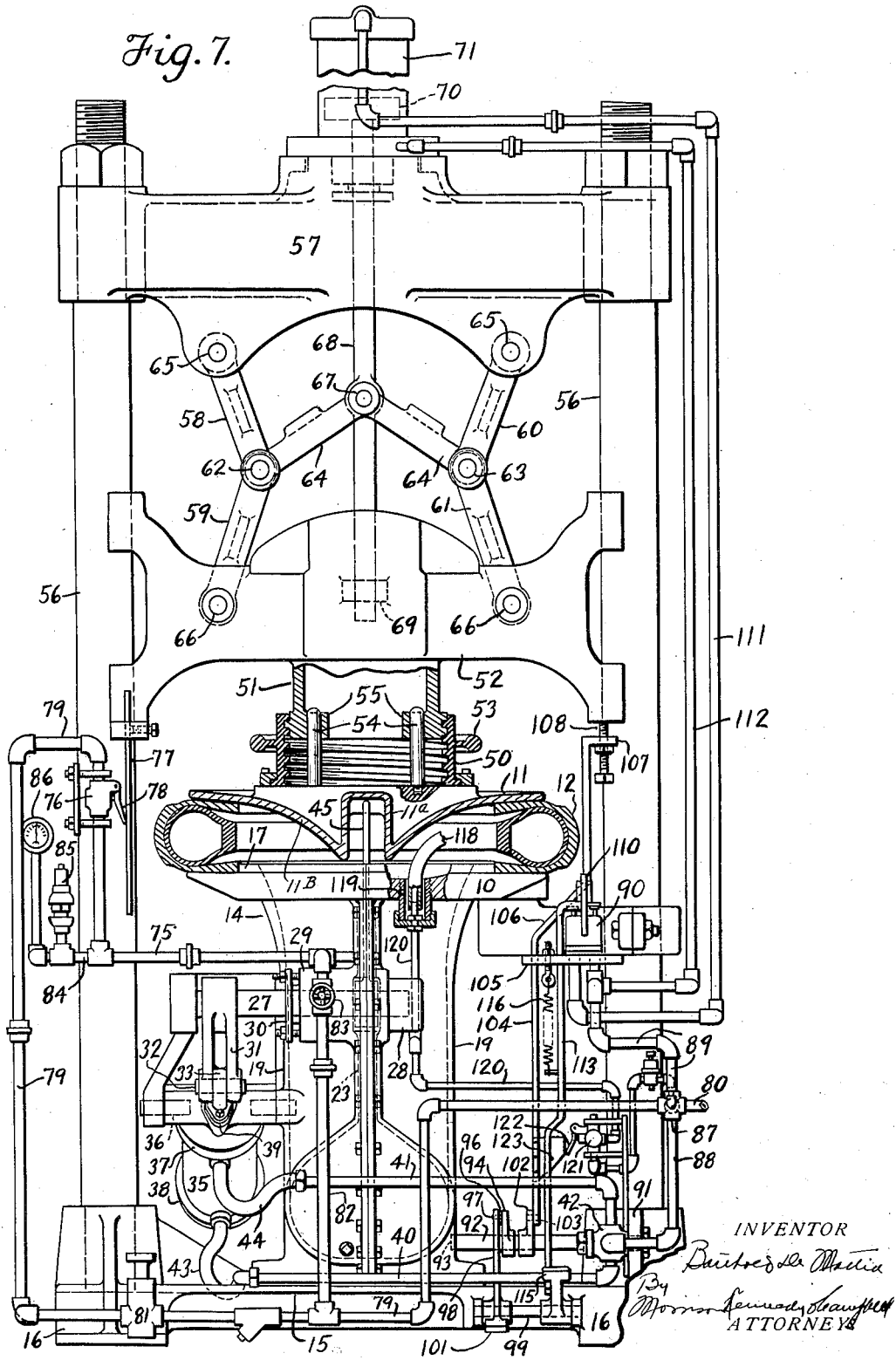
Fig. 7 is a view similar to Fig. 6, but showing a tire as having been shaped and a bag inserted therein.

By referring first to Figs. 1 to 5 inclusive, the novel method of inserting the bags in the tires will best be understood. In Figs. 1 and 2, the unvulcanized shaped tire 1 is shown in circular tire shape, while the bag 2 is shown as bent from its normal circular shape into elongated form. This elongation of the bag may be effected in any one of several different ways, as for example, by pushing it through an elongated slot 3 formed in a plate 4, said slot being of a width less than the diameter of the beads 5. The bag may be maintained in its own plane when elongated or otherwise shaped, but it is preferably curved longitudinally, as shown in Fig. 2. One end 2ᵃ of the elongated bag is now placed in the tire at a point in its periphery, this being possible by virtue of the fact that the width of the bag is less than the bead diameter. Thereafter, with the inserted end 2ᵃ acting as an anchorage, the side portions of the elongated bag are gradually moved through the slot 3 and into the plane of the tire where their resiliency and the internal pressure cause them progressively to expand or fill out the tire, as indicated by the dotted lines 6 and 7 in Fig. 1, that part of the bag which is outside the tire plane being maintained in elongated form or of contracted width by the slot 3. As the terminal end portion of the elongated bag moves through the slot 3 and into the plane of the tire, it may have a slight reverse bend as indicated at 8 in Fig. 3, but the natural resiliency of the bag and the internal pressure may be depended upon to cause this portion to snap into the tire and allow the bag to reassume its normal circular shape therein, as shown in Figs. 4 and 5. If desired however, pressure may be applied to the terminal portion 8, as by a pusher 9, to cause it to take its proper place within the tire. It will now be seen that the bag can be quickly and easily placed in the tire without having its walls seriously stressed, and even though the bead diameter of the tire be small. In fact, and as will be obvious, by this novel method of air bag insertion, the bead diameter of the tire could be much less than the smallest bead diameter (18″) now used in tire construction. When inserting the bag into the tire, it may be inflated or deflated, whichever is found most expedient.

Figure 8:
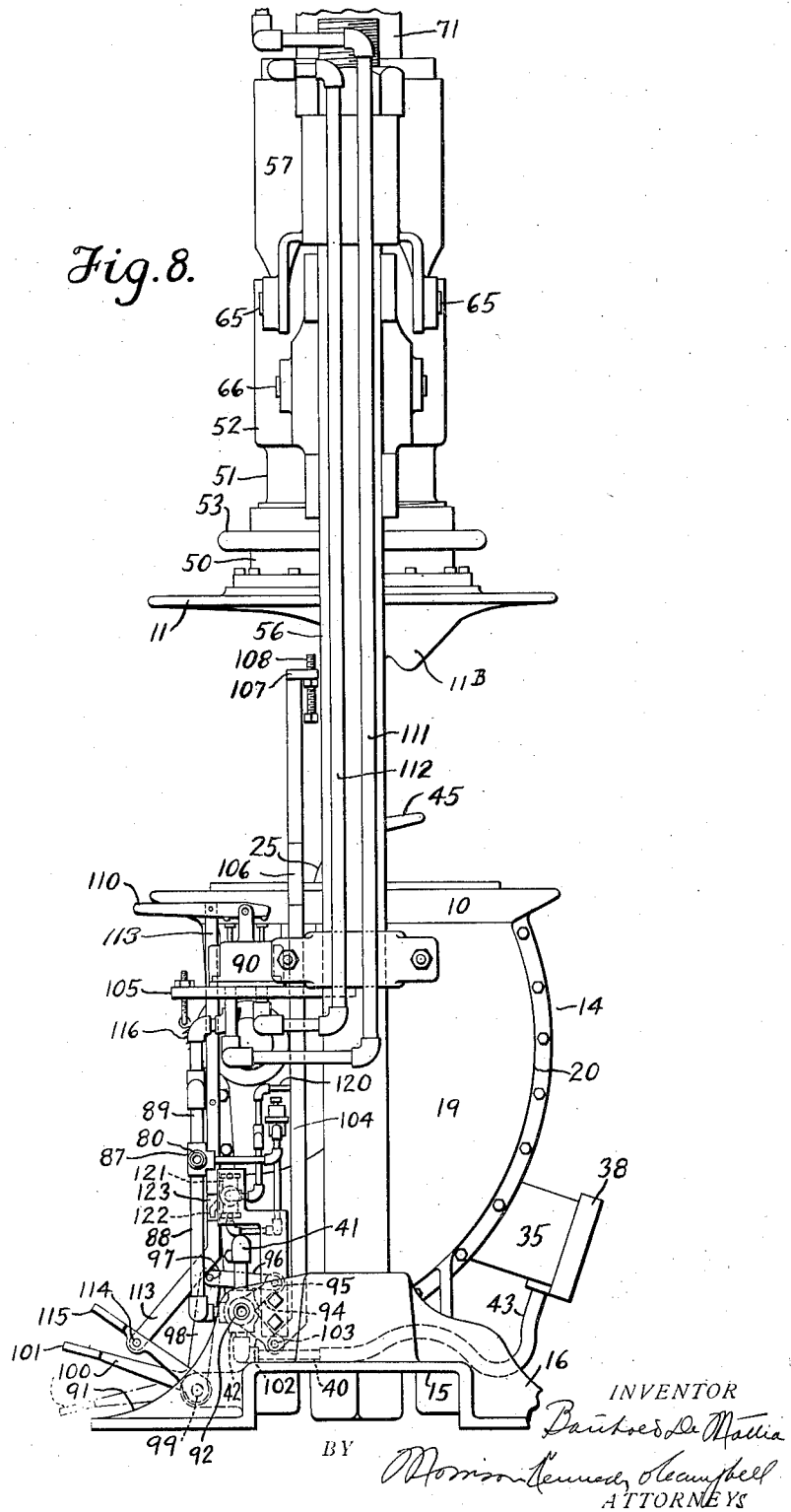
Fig. 8 is a view in elevation taken at one side of the press, with the parts in the same relation as in Fig. 6.
Figure 9:
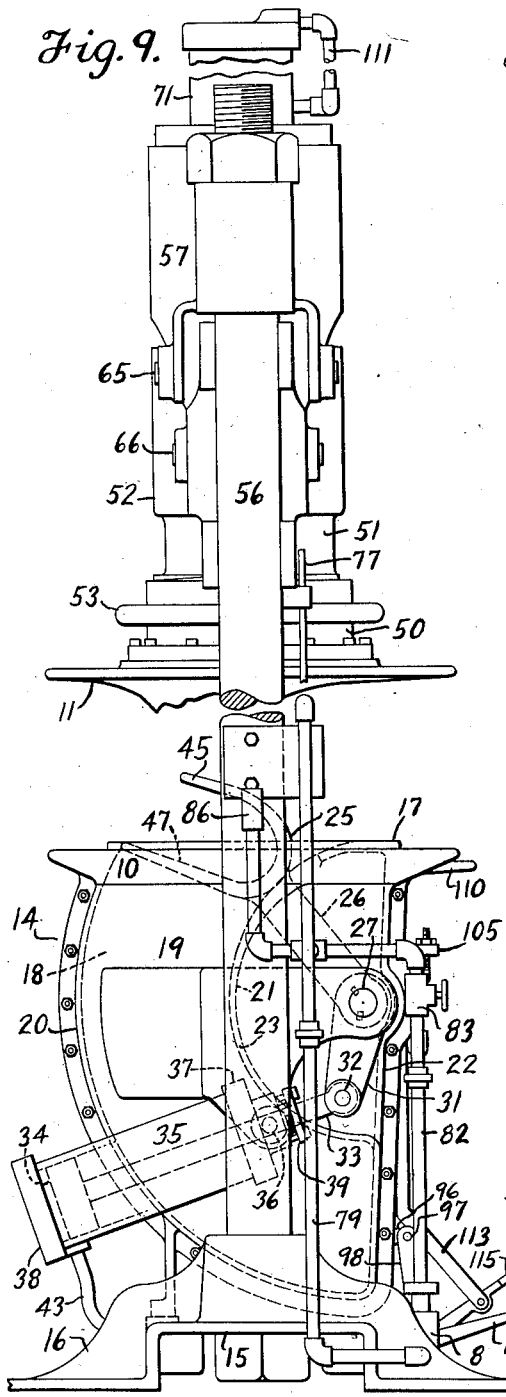
Fig. 9 is an elevational view taken at the opposite side of the press.
Figure 10:
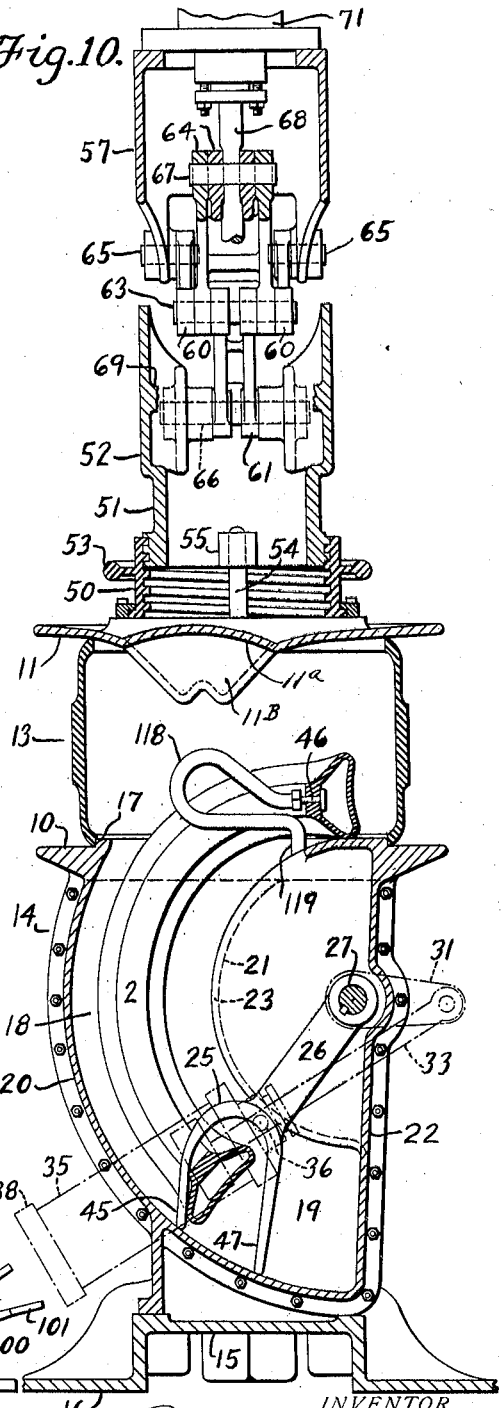
Fig. 10 is a vertical transverse sectional view approximately on line 10—10 of Fig. 6, but showing a bag drawn into the shaping member, and a tire pulley band between the press platens.

In Figs. 6 to 13 inclusive, there is illustrated a tire shaping press which includes apparatus for inserting the bags in accordance with the above described method. This press comprises a lower fixed platen 10 and an upper movable platen 11, which platens are adapted to cooperate in shaping a tire 12 (Figs. 7 and 11) when made in the form of a pulley band 13 (Fig. 10). The lower platen 10 is in the nature of an annular flange on the upper end of a casing 14 which is secured in any suitable manner to a substantially horizontal base member 15 having supporting legs 16 at its opposite ends, and an annular shoulder 17 on the platen 10 constitutes a seat for locating the lowermost bead of the pulley band 13 and for supporting the shaped tire. If desired, the platen 10 or its bead engaging shoulder 17 may be made removable to permit the substitution of other platens or shoulders for different sizes of tires. The platen and shoulder shown is intended for tires of small bead diameter, say for an 18″ wheel rim.

The casing 14, which when the press is in operation is sealed air-tight, contains an arcuate holder or pocket 18 in which the bag 2 is adapted to be placed, said holder presenting a bell-mouth receiving opening in the platen 10, and being defined by the side walls 19, 19 and the curved rear wall 20 of the casing, and by an internal curved wall or partition 21, the latter being formed with a central longitudinal slot 23 (Figs. 10 and 12) for a purpose to be hereinafter explained. The lower end of the holder 18 is closed by the straight front casing wall 22 which extends upwardly to the platen 10 in front of the curved wall 21, leaving a small space in between. The side walls 19, 19 are spaced apart at a distance considerably less than the bead diameter of the tire to be shaped, so that as the bag is drawn into the holder 18, it will be given the desired curved elongate shape, as shown in Figs. 2 and 10. In the latter figure, the bag is shown as uninflated.

Figure 12:
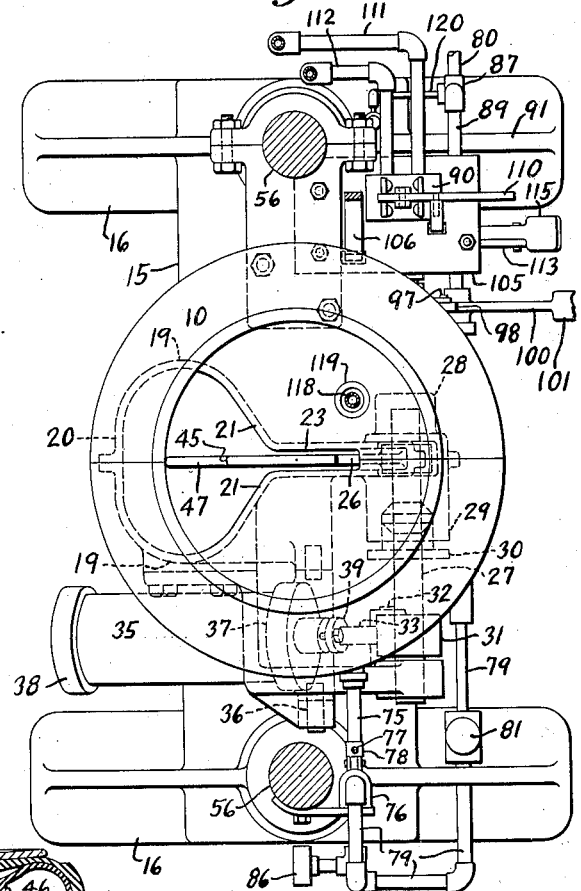
Fig. 12 is a horizontal sectional view taken on the line 12—12 of Fig. 6.

As clearly shown in Figs. 10 and 12, the aforesaid bell-mouth receiving opening of the holder or pocket 18 is located eccentrically with respect to the annular bead seat 17 on the platen 10 and will therefore occupy a similar relation to the tire band 13 when the latter is undergoing its shaping operation. As a result, when the air bag is inserted into the shaped tire band, as will later be described, the final or terminal portion of the bag in leaving the holder or pocket will need to be bent only enough to clear the bead edge of the tire band at the point diametrically opposite to that at which the leading end of the bag entered the tire band, somewhat as indicated in Fig. 3, thus practically insuring the proper positioning of the bag in the shaped tire band. By way of contrast, if the opening of the holder were located centrally of the tire band, the bending of the bag would have to be much greater, and to that extent would increase the difficulty of seating the terminal portion of the bag in the shaped tire band. In other words, in the present arrangement, the holder is so located with respect to the tire band as to direct the terminal portion of the bag into the shaped tire band at a point immediately adjacent, rather than remote from, the final position which it is to occupy therein.

For the purpose of drawing the bag into the holder 18 and thus elongating it from its normal circular shape, a fork or hook member 25 is mounted for arcuate movement into and out of said holder. This hook member 25 is carried at the end of an arm 26 which oscillates in the slot 23 and is secured to a shaft 27 journaled at 28 and 29 (Figs. 6 and 7) in the casing 14. The shaft 27 extends outwardly from the casing and through a packing gland 30, and has secured to its outer end an arm 31, which is pivotally connected at 32 to one end of a rearwardly extending piston rod 33. The other end of the piston rod 33 has secured to it a double-acting piston 34 which is fitted to operate in a rocking cylinder 35 pivotally supported at 36 beside the casing 14. Cylinder heads 37 and 38 form closures for the forward and rearward ends of the cylinder 35, the head 37 having a stuffing box 39 of any preferred construction through which the piston rod 33 slides. Pressure fluid, such as compressed air, is supplied to and exhausted from the opposite ends of the cylinder 35 through pipes 40 and 41 under the control of a four-way cock or valve 42 (as will later be described), said pipes being respectively connected with the cylinder by flexible hose sections 43 and 44 which leave the cylinder free to rock.

In the normal position of rest prior to the commencement of the operating cycle, the hook member 25 is in its uppermost position as shown in Fig. 9, with its upper finger or tine 45 extending above the platen 10. The bag need only be thrown onto the platen with the portion diametrically opposed to the inflating stem 46 disposed under said tine 45. Then, by admitting pressure fluid through the pipe 40 to the rear or lower end of the cylinder 35, the piston 34 and rod 33 will be driven forwardly and upwardly, rocking the shaft 27 and carrying the hook member 25 into the holder 18. In this movement of the hook member, the bag will be drawn into the holder, and by virtue of the restricted dimensions of the holder, the bag will be elongated, leaving one end projecting from the bell-mouth end of the holder, as indicated in Fig. 10. Subsequently, when the flow of pressure fluid in the cylinder is reversed, the hook member 25 will be moved outwardly again, causing the lower finger or tine 47 to push the bag out of the holder 18 and into a shaped tire on the platen 10 (see Fig. 11).

The upper movable platen 11 is in the form of an annular plate carried by the lower end of an internally threaded sleeve 50 mounted on a depending cylindrical extension 51 of a crosshead 52 (Figs. 6, 7 and 10). By rotating the sleeve 50 through the medium of a hand rim 53, the platen may be adjusted with reference to the crosshead, rotation of the platen being prevented by registration of dowel pins 54 in apertured bosses 55 within the cylindrical extension 51. As shown in several of the figures, the inner face of the platen 11 is formed with a downward projection 11$^b$ with concave walls which converge toward the holder 18 and which terminate substantially in axial alinement therewith. The curved walls of this projection 11$^b$ serve to deflect the engaging portions of the air bag outwardly and to guide them into the tire while the bag is being forced into final position. A clearance space or recess 11$^a$ is formed in the cone-shaped surface at its apex to receive the tine 45 of the hook member when the latter is in its upper position (see Fig. 7).

The crosshead 52 is disposed horizontally above the platen 10, and is guided in its vertical movements by spaced upright posts 56 which rise from and are anchored in the opposite ends of the base 15. The upper ends of these posts 56 are tied together by a cross-bar or head casting 57, which, in addition to maintaining the parallelism of the posts 56, constitutes a support for the power mechanism used to reciprocate the crosshead.

Such power mechanism for operating the crosshead comprises two pairs of toggles 58, 59 and 60, 61 which are respectively pivoted at 62 and 63 to links 64. The toggle members 58 and 60 are pivotally suspended at 65 to the cross-bar or head casting 57, while the toggle members 59 and 61 are pivotally connected with the crosshead 52 at 66. The links 64 are jointly connected as at 67, to substantially the midportion of a piston rod 68, which latter is adapted to slide vertically in axial alinement with the press platens. This piston rod 68 is guided at its lower end in an apertured web 69 of the crosshead, and at its upper end it is fitted with a piston 70 which operates in a cylinder 71 mounted on top of the crossbar 57. According to this arrangement of the parts, by admitting and exhausting compressed air to and from the opposite ends of the cylinder 71, the crosshead 52 will be caused to move the platen 11 toward and from the fixed platen 10, the toggle arrangement greatly multiplying the power produced by the cylinder 71, which may therefore be comparatively small. Such relative movement of the platens is intended to shape the tire 12 from its original pulley band form 13 by moving the upper bead toward the lower bead, and it is preferably at or near the end of this shaping operation that the bag is inserted in the tire.

To aid the platens 10 and 11 in shaping the tire, air under pressure is admitted to the sealed chamber which is formed within the pulley band and between the platens, so that as the platens commence to operate, the tread portion of the pulley band tire will be forced outwardly in the required manner. The air for this purpose is supplied through a pipe 75 which leads into the casing 14 (which is now air-tight) and thence through the holder 18 (as permitted by the slot 23) into the pulley band tire. The flow of air through the pipe 75 is controlled by a valve 76 which is adapted to be opened automatically by engagement of an adjustable rod 77, carried by the crosshead 52, with an actuating member 78 projecting from the valve casing. When the crosshead is in its uppermost position, as shown in Fig. 6, the rod 77 is out of engagement with the valve actuator 78, so that the valve 76 is closed, but as the crosshead descends to the point at which the upper platen 11 engages the upper bead of the pulley band, the rod 77 is brought into engagement with the actuator 78, and the valve is caused to open (see Fig. 7). Air is supplied to the valve 76 from a pipe 79 leading from a main supply line 80, and equipped with a pressure regulator 81. If desired, a by-pass pipe 82 may extend from the high pressure side of the pipe 79 to the pipe 75, said by-pass pipe 82 having a normally closed, manually operated valve 83 (Figs. 6 and 7). A branch 84 from the pipe 75 has been shown in the drawings as fitted with a relief valve 85, to avoid any excess pressure delivered through valve 76, and with a gauge 86 for indicating the air pressure within the pressure chamber.

The pipe 79 is connected to the main air supply line 80 through the medium of a cross fitting 87 from which a branch pipe 88 extends to the air bag cylinder control valve 42 before referred to, and another branch pipe 89 extends to a control valve 90 for the crosshead cylinder 71.

The valve 42 is in the form of an ordinary four-way tapered plug cock suitably supported from a fin 91 of the base 15, and whose plug is secured, in any suitable manner, to one end of a rod or shaft 92, the opposite end of which is journalled at 93 in the casing 14 (Figs. 6 and 7). Fast to the rod or shaft 92 is a short radial arm 94 having its outer end pivotally connected at 95 to the rear end of a link 96, the forward end of which is in turn pivotally connected at 97 to the upper end of an upright arm 98 of a bell crank lever (Fig. 8). This bell crank lever is rotatably supported on a shaft 99 at the front of the base 15 and has a forwardly extending arm 100 which is provided at its extremity with a pedal pad 101, whereby it may be rocked by foot pressure.

The rod or shaft 92 also has secured to it another radial arm 102, which is related at an angle of substantially 90° to the arm 94, and which has its outer end connected at 103 to the lower end of a push rod 104. This push rod 104 extends upwardly and is guided through an opening in a fixed plate 105 which constitutes a support for the valve 90, and above said plate the rod is formed with an offset 106 for the purpose of avoiding interference with the platens and the tire thereon. The upper end of the push rod 104 is provided with a right-angled bend 107 fitted with an adjustable abutment or set screw 108 which is disposed in the path of movement of the crosshead 52.

Prior to the commencement of the operating cycle, the pedal arm 100 is in the position shown in full lines in Fig. 8 and the push rod 104 is in its lowermost position. In this condition, air pressure is being maintained in the upper end of the cylinder 35. By depressing the pedal arm 100, however, the shaft 92 and the plug of valve 42 are given a quarter rotation, causing air to be supplied through pipe 40 to the lower end of cylinder 35, and opening the upper end of the cylinder to the atmosphere, thus resulting in movement of the hook member 25 downwardly into the bag shaping holder 18. Simultaneously with the depression of the pedal 100, the push rod 104 is moved up into the path of the crosshead, and as the crosshead approaches the end of its downward stroke, it engages the abutment 108 and pushes the rod down with it. By this downward movement of the rod 104, the flow of air through the valve 42 and to the cylinder 35 is automatically reversed at or near the end of the tire shaping operation, with the result that the bag which had previously been drawn into the holder 18 is now forced out of the same and into the tire. It will thus be seen that, in the operation of the improved press, the bag is not only automatically given its curved elongate form before the tire shaping process begins, but in addition is automatically inserted within the tire after it has been given its proper shape, the various mechanisms and parts all being properly coordinated to cooperate in the manner required.

The valve 90, which controls the admission and exhaust of compressed air at the opposite ends of the crosshead cylinder 71, is of a well known commercial type and has internal ports which are alternately opened and closed through the medium of a pivoted handle 110. The casing of valve 90 is connected with the upper end of the cylinder 71 by a pipe 111, and with the lower end of the cylinder by a pipe 112, these pipes serving to vent the cylinder through the valve casing as well as to supply the pressure thereto. The handle 110 has connected to it (Fig. 6) the upper end of a rod 113, whose lower end is connected at 114 to a pedal 115 which is also rotatably supported by the shaft 99. By depressing the pedal 115, the valve 90 is caused to supply air to the upper end of the cylinder 71 for the downward movement of the crosshead. It is to be noted that a tension spring 116 acts on the rod 113 normally to maintain it in its upper or raised position, so that the operator is required to maintain his foot pressure on the pedal 115 until the crosshead has completed its full downward movement for the tire shaping operation. At the end of this operation, however, the attendant need only remove his foot from the pedal 115, whereupon the spring 116 will actuate the valve 90 so as to supply air to the lower end of the cylinder 71 and restore the crosshead 52 and platen 11 to their upper positions.

It may be desirable at times to inflate the air bag before it is finally positioned within the shaped tire, and this inflating operation is also accomplished automatically. For this purpose, the inflating stem 46 of the air bag is initially connected to one end of a flexible hose 118 (Fig. 10), which is disposed in the bell-mouth end of the casing 14. The other end of said flexible hose 118 is connected at 119 to an air supply pipe 120 (Fig. 6), to which the supply of air is controlled by a valve 121. The rod 104 has an offset portion 123 disposed in the path of movement of an inclined arm 122 of said valve 121, so that when the rod 104 is pushed downwardly by the cross head 52, it will automatically open the valve and inflate the air bag, which (it may be observed) is at this time being pushed from the holder 18 into the tire. As a result, when the air bag is completely inserted within the tire, it is fully inflated at whatever pressure may be desired, and this internal pressure aids in bringing the bag to its full circular shape and in proper position within the tire, which has by this time itself been fully shaped.

Figure 11:
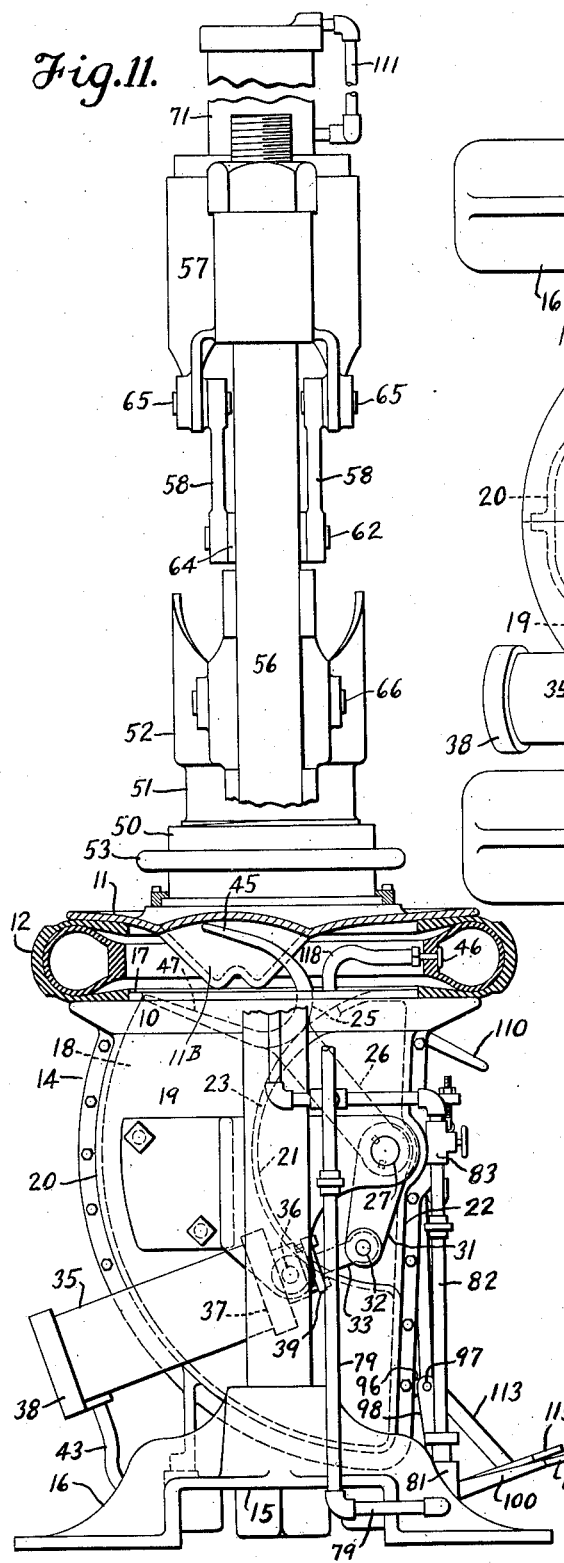
Fig. 11 is a view similar to Fig. 9, but taken at the end of the shaping operation.

In operating the improved press, the threaded sleeve 50 is first adjusted so that the platens will accommodate the width of tire pulley-band to be operated upon. Then, when the parts are in the positions shown in Figs. 6 and 9, the operator places an air bag upon the lower platen 10 and in engagement with the hook member 25, and connects the flexible hose 118 with the inflating stem 46. The pedal 100 is then depressed, causing the hook member 25 to descend into the holder 18 as above described and carrying with it the air bag, which is thereby given its curved elongate form. The operator next places a tire pulley-band 13 on the platen 10 (the air bag being out of the way) and depresses the pedal 115, whereupon the cross-head 52 is moved down and with it, the upper platen 11. As the platen 11 comes into engagement with the upper bead of the pulley-band (Fig. 10), the rod 77 engages the valve actuator 78, opening the valve 76 and admitting air under pressure to the interior chamber formed within the pulley band. Further movement of the platen 11 toward the platen 10 results in the shaping of the tire pulley-band, and as the crosshead reaches the lower end of its stroke, it will, through the push rod 104, reverse the valve 42 and cause the hook member to be moved upwardly to push the air bag into the shaped tire, simultaneously opening valve 121 and admitting air of predetermined pressure into the air bag (Figs. 7 and 11). While the method of inserting the air bag into the tire is the same as first described, it will be understood that the machine carries out the operation with such rapidity that no time is lost in the shaping of the tire. Upon the completion of the downward stroke of the crosshead, the operator removes his foot from the pedal 115 and the spring 116 raises the valve handle 110 to its other extreme position, whereupon the cross-head and its associated parts will move upwardly. The shaped tire, with the air bag properly placed therein, can now be taken off the platen 10, ready for placing in a vulcanizing mold or press. The machine is of simple but rugged construction, and operates very rapidly and efficiently with a minimum amount of effort on the part of the operator.

Figure 13:
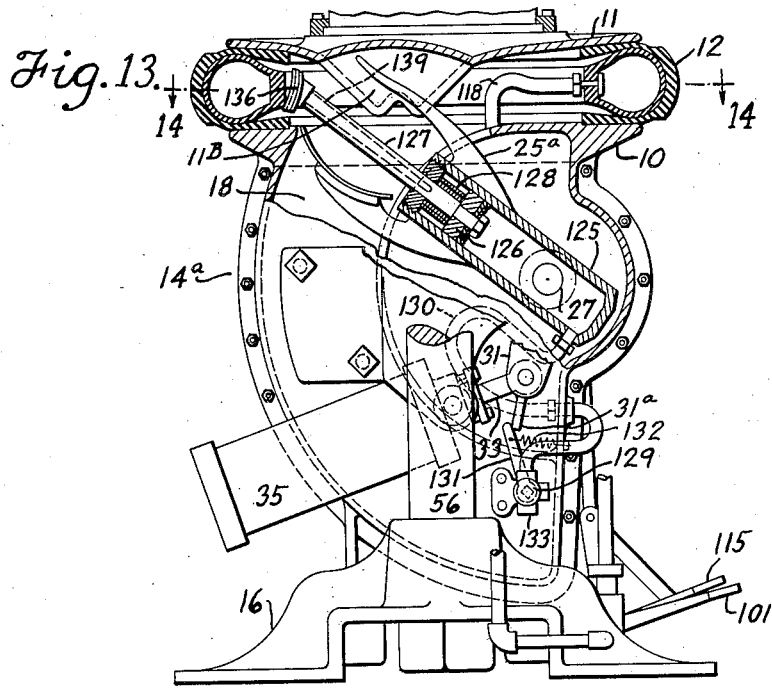
Fig. 13 is a fragmentary side elevation, partly in section of a modified form of the invention.
Figure 14:
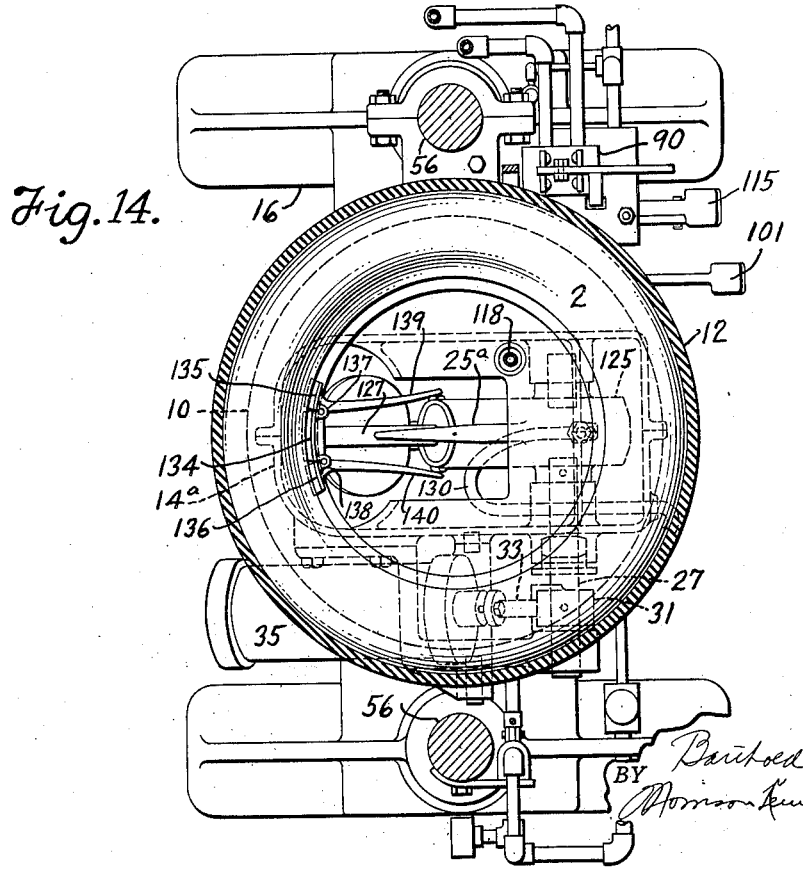
Fig. 14 is a horizontal sectional view taken on the line 14—14 of Fig. 13.

It might be desirable to push the trailing end of the bag into its final position in the tire, and for this purpose an alternative arrangement is shown in Figs. 13 and 14. Here, the casing 14ᵃ of the press is substantially the same as the casing 14, and all the other parts are the same, with the exception of the hook member. In this form of the invention, the hook member 25ª is carried by a small rocking cylinder 125 which, like the arm 26 of the first form, is secured to the shaft 27. Slidable within said cylinder 125, is a piston 126 having a piston rod 127 extending rearwardly between the tines of the fork or hook member 25ª. A compression spring 128 acts against the piston 126 to urge it toward the lower or forward end of the cylinder 125, and at the end of the operating cycle, air under pressure is admitted to said lower end of the cylinder to move the piston outwardly or upwardly against the action of the spring.

A three-way valve 129, mounted outside of the casing 14ª as shown, is connected by a flexible hose 130 to the end of the cylinder 125. This valve has an actuating arm 131 which, under the influence of a tension spring 132, is normally maintained in closed or exhausting position, so that the cylinder is vented through the outlet 133. The end of the arm 131 is disposed in the path of inward movement of an extension 31ª on the arm 31, so that as the piston rod 33 approaches its inner limit of movement to force the hook upwardly, said extension 31ª will engage the arm 131 and actuate the valve 129 to admit air to the cylinder 125.

The outer end of the piston rod 127 carries a segmental pusher plate 134 which is adapted to engage the trailing end of the air bag as it moves into the plane of the tire, and to push the same into place in the tire. This pusher plate 134 is preferably curved concave in the vertical plane and convex in the horizontal plane so as to more evenly fit the inner periphery of the air bag; and, in order to increase the engaging surface, additional segments 135 and 136 are pivotally attached as at 137 and 138 to the opposite ends of the plate 134. Guiding arms 139 and 140 are associated with the additional segments 135 and 136, being arranged to bear against the upper or rear end portion of the cylinder 125 with a cam action. With this arrangement, the pusher members are adapted to occupy a relatively small space when in the bottom of the holder 18, yet they will engage a substantial portion of the air bag to give it the final push into the tire. The pivoted segments 135 and 136 will automatically conform to the shape of the engaging portion of the air bag and will distribute the pressure from the piston rod 127 rather than to concentrate it at one point. Any number of such segments may be employed, depending upon the particular design of the press, so that in this respect the invention is not restricted to the use of only two segments. The object is to increase the engaging surface of the pusher as above stated, and to distribute the pushing forces to a plurality of different points, so that the air bag will positively and easily be returned to its original circular shape in the final operation of the press.

From the foregoing it will be evident that a novel method and improved apparatus have been provided for inserting air bags in tires. The invention is, of course, susceptible of various modifications in the details of construction and in the steps of the method, and the right is herein reserved to make such changes as fall within the scope of the appended claims without departing from the spirit of the invention.

Having thus described my invention, what I claim is:

1. The method of placing a circular inflatable former in a pneumatic tire, which consists in imparting to the former a curved elongate shape, and inserting the former as so shaped into the tire by an endwise motion in an arcuate path conforming to the curvature of the elongated former.

2. The method of placing a circular inflatable former in a pneumatic tire, which consists in elongating the former sufficiently to give it a width less than the bead diameter of the tire, bending the elongated former longitudinally out of its own plane, placing one end of the bent, elongated former into the tire at some point in its periphery, and gradually moving the remainder of the former into the tire, in a generally diagonal direction and permitting it to return to its normal circular shape progressively therein.

3. A machine of the class described comprising means for supporting a tire, a holder for an inflatable former disposed at one side of the tire supporting means, said holder being curved longitudinally and being of a width less than the bead diameter of the tire whereby to impart to said former a curved elongate shape, and a hook member for drawing said former into the holder and for subsequently pushing it therefrom into the supported tire.

4. A machine of the class described comprising means for supporting a tire, a holder for an inflatable former disposed at one side of the tire supporting means, said holder being curved longitudinally and being of a width less than the bead diameter of the tire whereby to distort said former from circular to curved elongate shape, a pivoted hook member movable into and out of the holder, said hook member being adapted to engage said former to draw it into the holder in its inward movement and to push it therefrom into the supported tire in its outward movement, means including a pressure cylinder for rocking said hook member, and means for controlling admission and exhaust of pressure fluid to and from the opposite ends of said cylinder.

5. A machine of the class described comprising a fixed platen and a movable platen adapted to cooperate in giving shape to a tire made in pulley-band form, a sealed holder disposed outside the fixed platen for receiving a circular inflatable former, said holder being curved longitudinally and of a width less than the bead diameter of the tire so as to impart to said former a curved elongated shape, and said holder communicating at one end with a pressure chamber defined between the opposed platens and within the tire, means for moving the inflatable former into the holder to elongate it and for subsequently expelling it therefrom into the shaped tire, and means for supplying pressure fluid to said pressure chamber to cooperate with the platens in shaping the tire.

6. A machine of the class described comprising a fixed platen and a movable platen adapted to cooperate in giving shape to a tire made in pulley-band form, a sealed holder disposed outside the fixed platen for receiving a circular inflatable former, said holder being curved longitudinally and of a width less than the bead diameter of the tire so as thus to impart to said former a curved elongate shape, and said holder communicating at one end with a pressure chamber defined between the opposed platens and within the tire, a hook member movable into and out of the holder and adapted to draw the inflatable former into said holder in its inward movement and to push it therefrom into the shaped tire in its outward movement, mechanism operated by fluid pressure to actuate said hook member, and means for supplying pressure fluid to said pressure chamber to cooperate with the platens in shaping the tire.

7. A machine of the class described comprising a lower fixed platen and an upper movable platen, said platens having their opposing faces adapted sealingly to engage the opposite edges of a tire pulley-band, a crosshead movable toward and from the fixed platen and carrying the movable platen, mechanism for moving the crosshead, an air bag holder disposed below the fixed platen and opening at its upper end into the space within the pulley-band between the platens, said holder being curved longitudinally and being of a width considerably less than the diameter of an air bag, an arm movable into and out of the holder and having means for engaging the air bag to draw it into said holder in its inward movement and to expel it therefrom in its outward movement to position it within the tire, means including a pressure cylinder for actuating said arm, a valve for controlling admission and exhaust of pressure fluid to and from the opposite ends of said cylinder, means for manually operating said valve to control the inward movement of the arm, means cooperating with the crosshead for automatically operating said valve to control the outward movement of the arm, and means for automatically supplying pressure fluid to the interior of the pulley-band at a predetermined point in the movement of the crosshead.

8. The method of placing an inflatable former within a tire, which consists in holding the tire on a support, moving the former into a longitudinally curved shaping chamber at one side of the tire whereby to give to the former a curved elongate form and a width less than the bead diameter of the tire, and moving the elongate former in its curved condition end first from the chamber and into the tire, while permitting the side portions of said former progressively to return to their normal circular shape as they enter the tire.

9. The method of placing a circular inflatable former in a pneumatic tire, which consists in holding the tire on a support, elongating the former sufficiently to give it a width less than the bead diameter of the tire, moving the elongated former gradually into the tire in an endwise direction, that portion of the former which enters the tire being allowed progressively as it enters to resume its circular shape therein, while the trailing or uninserted portion of the former is maintained in elongated condition until it finally enters the tire and is then allowed to return to circular shape, and applying pressure to the terminal end portion of the inflatable former after it enters the tire in a direction opposite to that in which said former is moved into the tire in order to insure the return of said terminal end portion to circular shape within the tire.

10. A machine of the class described comprising means for supporting a tire, a holder for an inflatable former disposed at one side of the tire supporting means, said holder being curved longitudinally and of a width less than the bead diameter of the tire, whereby to distort said former from circular to curved elongated shape, and means for moving said former into the holder and subsequently expelling it therefrom while maintained in its curved elongated form into the tire.

11. A machine of the class described comprising means for supporting a tire, and means for distorting an inflatable former from circular to elongated shape at one side of the tire, and introducing said former endwise into the tire while permitting it progressively to return to its original circular shape therein, together with means for engaging the terminal end portion of the inflatable former as it enters the tire and for forcing it outwardly into circular shape within the tire.

12. A machine of the class described comprising means for supporting a tire, a holder for an inflatable former disposed at one side of the tire supporting means, said holder being of a width less than the bead diameter of the tire whereby to distort said former from circular to elongated shape, a hook member movable into and out of said holder, said hook member being adapted to engage said former to draw it into the holder in its inward movement and to push it therefrom into the supported tire in its outward movement, and means for actuating said hook member, characterized by the fact that the hook member is in the form of a pressure cylinder containing a piston which carries a pusher adapted to engage the terminal end portion of the inflatable former at the completion of the upward movement of the hook member and positively force said former into circular shape within the tire.

13. A machine of the class described comprising a fixed platen and a movable platen adapted to cooperate in giving shape to a tire made in pulley-band form, a sealed holder disposed outside the fixed platen for receiving a circular inflatable former, said holder being of a width less than the bead diameter of the tire so as to impart to said former an elongated shape, and said holder communicating at one end with a pressure chamber defined between the opposed platens and within the tire, means for moving the inflatable former into the holder to elongate it and for subsequently expelling it therefrom into the shaped tire, and means for supplying pressure fluid to said pressure chamber to cooperate with the platens in shaping the tire, characterized by the fact that the movable platen is formed with an inner conical face to aid in positioning the inflatable former within the tire.

14. A machine of the class described comprising means for supporting a tire, a holder for an inflatable former disposed at one side of the tire supporting means, said holder being of a width less than the bead diameter of the tire whereby to distort said former from circular to elongated shape, a hook member movable into and out of said holder, said hook member being adapted to engage said former to draw it into the holder in its inward movement and to push it therefrom into the supported tire in its outward movement, and means for actuating said hook member, characterized by the fact that the hook member is in the form of a pressure cylinder containing a piston which carries a pusher adapted to engage the terminal end portion of the inflatable former at the completion of the upward movement of the hook member and positively force said former into circular shape within the tire, and including a valve actuated by the inward and upward movements of the hook member for controlling the admission and exhaust of pressure fluid to and from the pusher cylinder.

15. A machine of the class described comprising a fixed platen and a movable platen adapted to cooperate in giving shape to a tire made in pulley-band form, a sealed holder disposed outside the fixed platen for receiving a circular inflatable former, said holder being of a width less than the bead diameter of the tire so as thus to impart to said former an elongate shape, and said holder communicating at one end with a pressure chamber defined between the opposed platens and within the tire, a hook member movable into and out of the holder and adapted to draw the inflatable former into said holder in its inward movement and to push it therefrom into the shaped tire in its outward movement, mechanism operated by fluid pressure to actuate said hook member, and means for supplying pressure fluid to said pressure chamber to cooperate with the platens in shaping the tire, characterized by the fact that the movable platen is formed with an inner conical face to aid in positioning the inflatable former within the tire, and by the further fact that the inner conical face of the movable platen is recessed at its apex to receive the hook member for the inflatable former when said member is moved outwardly to position said former within the shaped tire.

16. A machine of the class described comprising means for supporting a tire, and means for distorting an inflatable former from circular to elongated shape at one side of the tire, and introducing said former endwise into the tire while permitting it progressively to return to its original circular shape therein, together with means for engaging the terminal end portion of the inflatable former as it enters the tire and for forcing it outwardly into circular shape within the tire, and characterized by the fact that said means act upon the terminal end portion of the inflatable former in a plurality of directions.

17. A machine of the class described comprising means for supporting a tire, and means for distorting an inflatable former from circular to elongated shape at one side of the tire, and introducing said former endwise into the tire while permitting it progressively to return to its original circular shape therein, together with means for engaging the terminal end portion of the inflatable former as it enters the tire and for forcing it outwardly into circular shape within the tire, and wherein said means are in the form of a plurality of members arranged to engage the terminal end portion of the inflatable former and press it outwardly in diverging lines.

18. A machine of the class described comprising means for supporting a tire, a holder for an inflatable former disposed at one side of the tire supporting means, said holder being of a width less than the bead diameter of the tire, whereby to distort said former from circular to elongate shape, and opening into the tire in eccentric relation thereto, and means for moving said former into the holder and subsequently expelling it therefrom into the tire.

19. A machine of the class described comprising means for supporting a tire, a holder for an inflatable former disposed at one side of the tire supporting means, said holder being of a width less than the bead diameter of the tire, whereby to distort said former from circular to elongate shape, and opening into the tire in eccentric relation thereto so as to direct the terminal portion of the former into the tire at a point immediately adjacent the final position which it is to occupy therein, and means for moving said former into the holder and subsequently expelling it therefrom into the tire.

20. A machine of the class described comprising a fixed platen and a movable platen adapted to cooperate in giving shape to a tire made in pulley-band form, a sealed holder disposed outside the fixed platen for receiving a circular inflatable former, said holder being of a width less than the bead diameter of the tire so as thus to impart to said former an elongate shape, and said holder communicating at one end with a pressure chamber defined between the opposed platens and within the tire, the communicating end of the holder being located eccentrically with respect to the tire, a hook member movable into and out of the holder and adapted to draw the inflatable former into said holder in its inward movement and to push it therefrom into the shaped tire in its outward movement, means for actuating said hook member, and means for supplying the pressure fluid to said pressure chamber to cooperate with the platens in shaping the tire.

21. A machine according to claim 20 wherein the movable platen is provided with a cone-shaped projection located eccentrically thereon so as to aline with the opening of the holder into the pressure chamber.

BARTHOLD DE MATTIA.